UNITED STATES PATENT OFFICE.

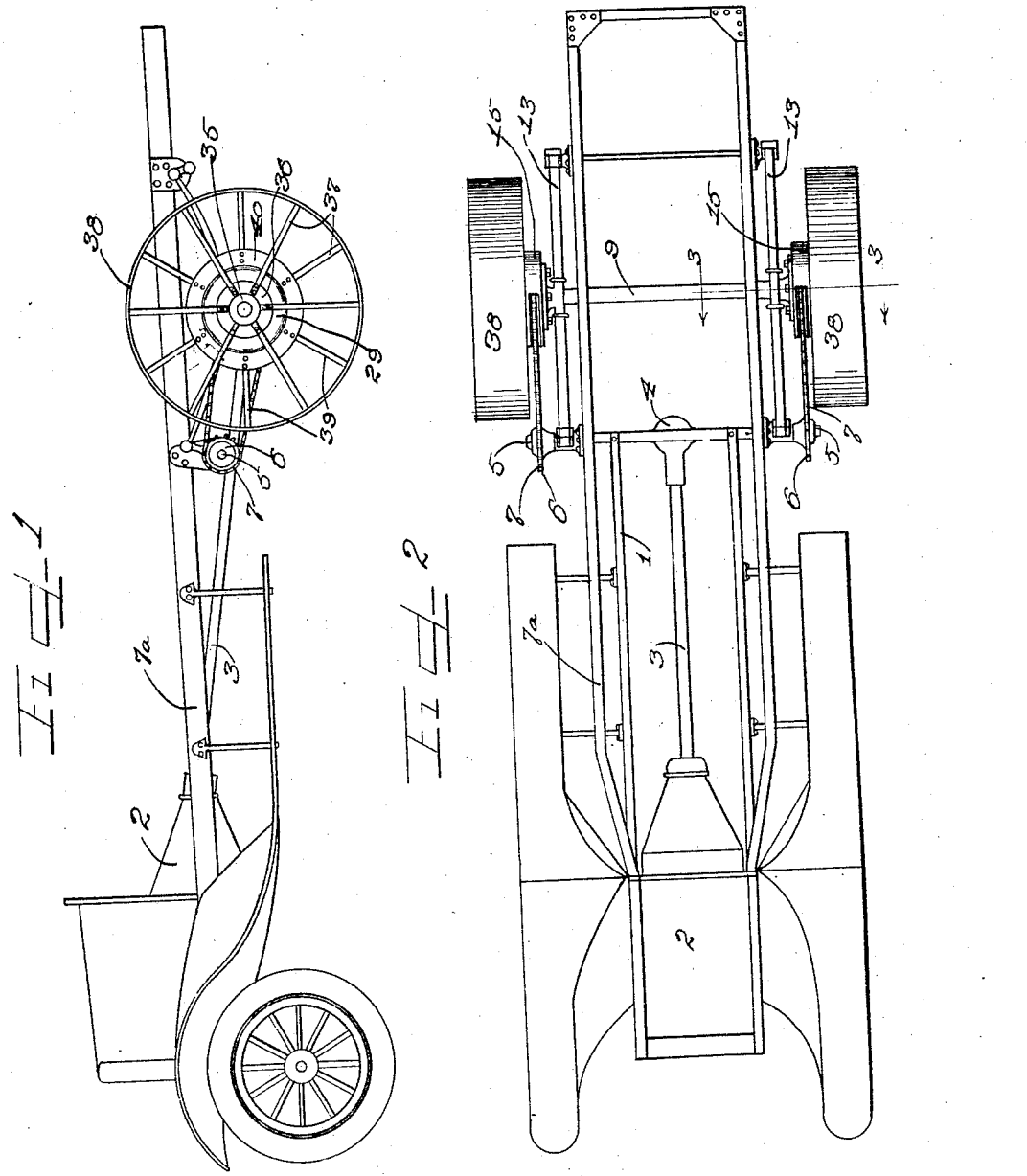

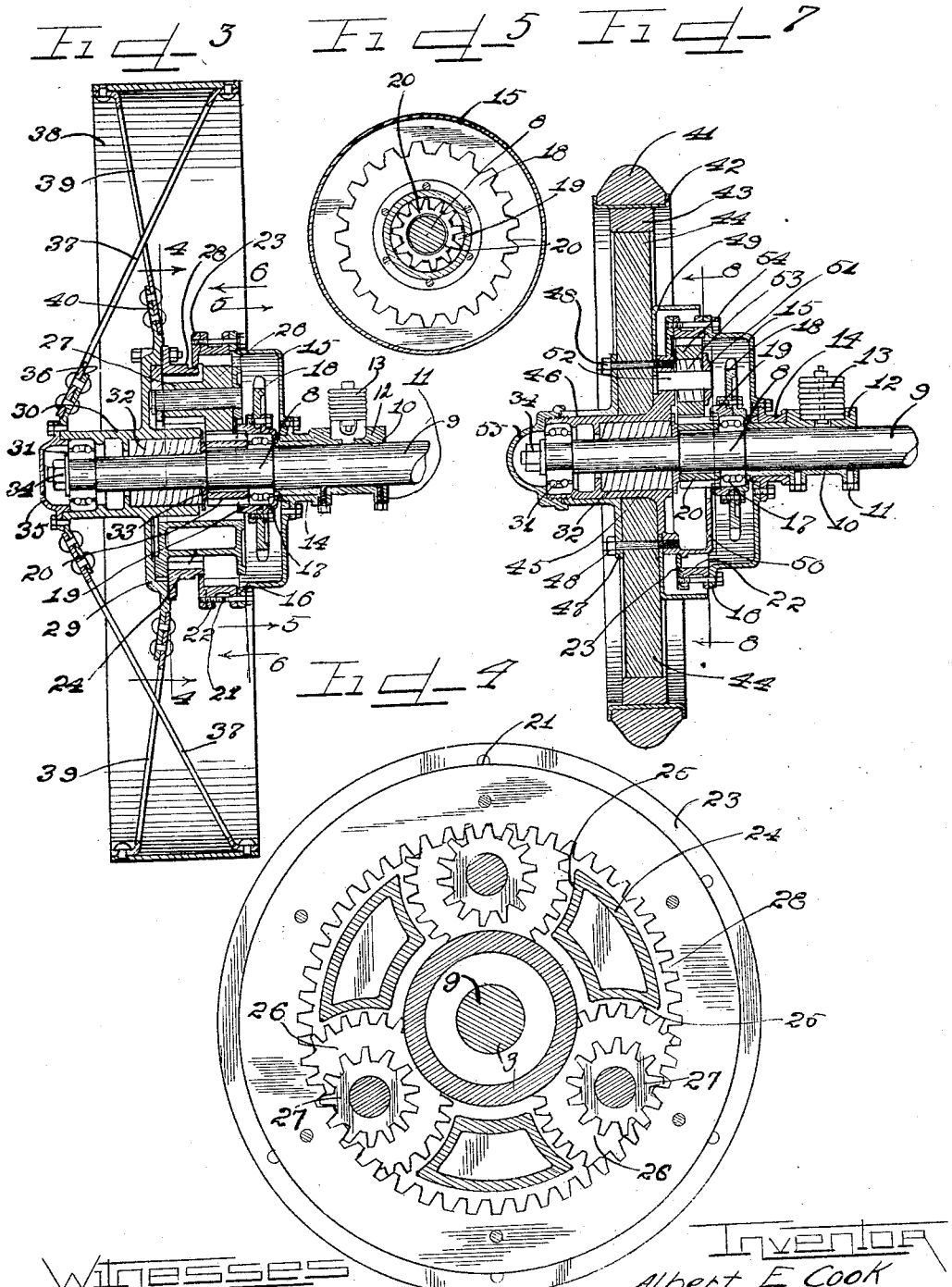

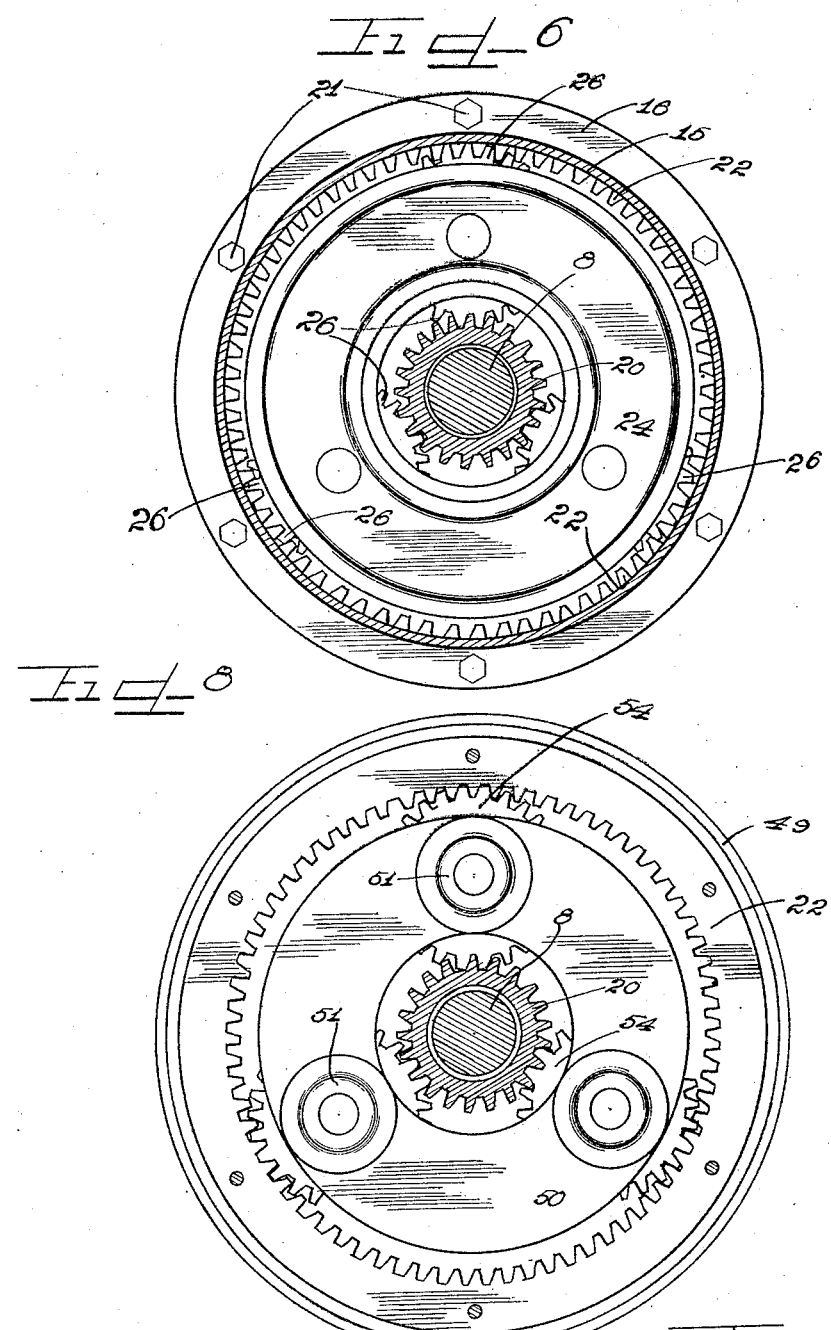

ALBERT E. COOK, OF EVANSTON, AND THOMAS VAN TUYL, OF KANKAKEE, ILLINOIS; SAID VAN TUYL ASSIGNOR TO SAID COOK.

INTERCHANGEABLE TRUCK AND TRACTOR ATTACHMENT.

1,417,796.   Specification of Letters Patent.   Patented May 30, 1922.

Application filed June 14, 1918. Serial No. 240,096.

*To all whom it may concern:*

Be it known that we, ALBERT E. COOK and THOMAS VAN TUYL, citizens of the United States, and residents of the city of Evanston, in the county of Cook and State of Illinois, and city of Kankakee, in the county of Kankakee and State of Illinois, respectively, have invented certain new and useful Improvements in an Interchangeable Truck and Tractor Attachment; and we do hereby declare that the following is a full, clear, and exact description of the same, reference being had to the accompanying drawings, and to the numerals of reference marked thereon, which form a part of this specification.

This invention relates to an improved form of a driving mechanism or attachment for vehicles adapted to readily replace portions of the vehicle to permit the vehicle to be driven as a tractor or truck at a reduced rate of speed through interchangeable speed reducing wheels.

It is an object of this invention to construct a detachable vehicle attachment adapted to drive a vehicle at different rates of speeds and convert the vehicle into a tractor or truck by the interchange of wheels.

It is also an object of this invention to provide a detachable mechanism adapted to be readily attached to a vehicle to drive the same from the power plant thereof through interchangeable wheels at different rates of speed.

It is furthermore an object of the invention to construct a mechanism adapted to coact with either a speed reducing tractor or truck wheel to drive a vehicle at a different rate of speed from that transmitted by the power plant of said vehicle.

It is furthermore an object of this invention to construct a device adapted to removably replace parts of a vehicle, and provided with driving means adapted to receive different types of speed change wheels thereon to drive said vehicle as a tractor or truck at different reduced rates of speed.

It is an important object of the invention to construct a device of simple and effective construction adapted to replace parts of a power driven vehicle to permit said vehicle to be driven at different rates of speed from that imparted by the power plant of the vehicle to convert the same into a tractor or truck.

Other and further important objects of our invention will be apparent from the disclosures in the drawings and specification.

The invention (in a preferred form) is illustrated in the drawings and hereinafter more fully described.

On the drawings:—

Figure 1 is a side elevation of a vehicle chassis equipped with tractor wheels embodying the principles of this invention.

Figure 2 is a top plan view thereof.

Figure 3 is an enlarged detail section taken on line 3—3 of Figure 2, showing parts in elevation.

Figure 4 is an enlarged sectional view taken on line 4—4 of Figure 3.

Figure 5 is a section taken on line 5—5 of Figure 3, with parts shown in elevation.

Figure 6 is an enlarged section taken on line 6—6 of Figure 3.

Figure 7 is a vertical section taken through a modified form of wheel.

Figure 8 is an enlarged detail section taken on line 8—8 of Figure 7.

As shown on the drawings:—

The reference numeral 1, indicates the chassis of an automobile, 2 the engine or power plant thereof, 3 the driving shaft, and 4 the differential. Connected to the differential in the usual manner are intermediate or regular driving axles 5, each having a driving sprocket 6, secured on the outer end thereof around which a driving chain 7, is trained. Mounted on a tractor attachment frame 7ª, secured to the chassis 1, is a rear axle 9, having the ends thereof reduced as denoted by the reference numeral 8. The equipment at each end of the rear axle is the same and the description will be confined to one end only.

Secured on the outer portion of the axle 9, by means of screw bolts 11, is a collar 10, provided with a box 12, to afford a seat for a rear spring 13. Mounted upon the collar 10, to the outside of the box 12, is a flanged ring 14, to the flange of which is rigidly secured a drum 15, provided with an apertured flange 16. Disposed upon the reduced portion 8, of the axle 9, is a ball bearing 17, upon which is rotatably mounted a sprocket-wheel 18, around which the driving chain 7, is trained. The drum 15, is provided with suitable openings, as clearly shown in Figure 2, to permit the chain 7, to be engaged on the sprocket wheel. An internal gear 19, is rigidly secured to the inner side of the sprocket-wheel 18. Rotatably disposed around the reduced axle portion 8, to the outside of the bearing 17, is a floating driving gear 20, one end of which is loosely mounted in the internal gear 19.

Rigidly secured by means of bolts 21, to the drum flange 16, is a stationary internal gear 22, having a ring plate 23, secured on the outer side thereof. A spider 24, projects into the stationary internal gear 22, and is provided with a plurality of chambers 25, in each of which is disposed a double gear member comprising a large inner gear 26, and a small outer gear 27, integrally formed thereon. The large inner gears 26, mesh with the stationary internal gear 22, and with the floating driving gear 20, to adjustably hold the same in position, while the small outer gears 27, are in mesh with a large movable internal gear 28, secured on the inner surface of a cover plate 29, which is integrally formed at right angles upon a hub 30, rotatably mounted on a ball bearing 31, and a roller bearing 32, which are engaged on the outer reduced portion of the rear axle 9, as clearly shown in Figure 3. Disposed on the axle 9, between the inner end of the hub 30, and the driving gear 20, is a ring or washer plate 33. The end of the axle 9, is threaded to permit a nut 34, to be threaded thereon to hold the inner ring of the ball bearing in position. Secured to the outer end of the hub 30, is a cap 35. Integrally formed on the outer end of the hub 30, is an inwardly directed or inclined flange 36, to which is rigidly secured the inner ends of a plurality of inwardly directed straps, rods or spokes 37, the upper or outer ends of which are rigidly secured to the inner peripheral margin of the inner surface of a tractor wheel rim 38. Rigidly secured to the outer peripheral margin of the inner surface of the rim 38, are the outer or upper ends of a plurality of straps, rods or spokes 39, inclined in a direction opposite to that of the inclined spokes 37, and having the lower or inner ends thereof rigidly secured to an outwardly inclined flange 40, integrally formed on the cover plate 29.

In the truck form of the device shown in Figures 7 and 8, the truck wheel comprises a tire 41, seated in a flanged rim 42, which is mounted upon a felloe 43, having the outer ends of the wheel spokes 44, secured thereto. The inner ends of the spokes 44, rest upon a hub 45, rotatably mounted upon the ball bearing 31, and the roller bearing 32, engaged upon the reduced end of the axle 9. Mounted upon the hub 45, is a collar 46, having a flange ring 47, integrally formed at right angles on the inner end thereof and disposed adjacent the spokes 44, and secured thereto by bolts 48, which project through said flange ring 47, and through said spokes. The bolts 48, also project through suitable apertures formed in a drum 49, disposed between the spokes 44 and a spider 50. The spider 50, is integrally formed on the inner end of the hub 45, and the threaded ends of the bolts 48, are securely engaged therewith. The inner plate of the spider 50, has a plurality of bosses 51, formed therein in which are engaged the inner ends of a plurality of stub shafts 52, the outer ends of which are engaged in the outer plate of said spider as shown in Figure 7. Mounted on roller bearings 53, disposed around each of the stub shafts 52, is a gear 54, which meshes with the floating driving gear 20, and with the stationary internal gear 22, around which the drum 49, is disposed to enclose the same. Threaded on the hub 45, is a cap 55, for enclosing the end of the axle 9.

The operation is as follows:—

By referring to the tractor form of construction shown in Figures 1 to 6, inclusive, it will be seen that the rear driving wheels of the vehicle are first removed and the tractor or truck attachment is then mounted in position as shown in Figure 1, associated with the standard parts of the vehicle. The driving belt or chain 7, is trained around the sprocket-wheel 18. When the engine 2, is started a drive is transmitted through the differential to the axles 5, which rotate the sprockets 6, and thereby the chains 7, causing rotation of the sprocket-wheels 18, and the small internal gears 19, forming a part thereof.

The internal gears 19, which are in mesh with the floating driving gears 20, causes rotation of the same. Rotation of the driving gears 20, rotates the gears 26, and the gears 27, which are in mesh with the stationary internal gears 22, and the movable internal gears 28, respectively. The gears 26, travel around the stationary internal gears thereby carrying the gears 27, and the spiders 24, therewith and causing rotation of the internal gears 28, whereby the drive is transmitted to the hubs 30, and the spokes 37 and 39, to the rims 38, of the tractor wheels which are rotated at a speed less than that imparted by the power plant 2, of the vehicle. The reduction in speed is obtained from the speed reducing gear arrangement, the amount of reduction in speed depending upon the respective gear ratios.

The operation of the truck form of wheel shown in Figures 7 and 8, is similar to that already described. Rotation of the sprocket wheel 18, and the internal gear 19, thereof by the driving chain 7, causes rotation of the floating driving gear 20, which is in clutch contact with the internal gear 19, and meshes with the gears 54. The gears 54, are accordingly rotated and travel around the stationary internal gear 22, carrying the spider 45, therewith and consequently rotating the wheel at a reduced rate of speed through the reducing gear mechanism.

We are aware that numerous changes may be made and various details of construction may be varied through a wide range without departing from the principles of this invention, and we therefore do not purpose limiting the patent granted otherwise than necessitated by the prior art.

We claim as our invention:—

1. A speed reduction device comprising an axle, driving means rotatable thereon, a floating gear disposed around said axle and connected with said driving means, and a speed reduction mechanism driven by said floating gear.

2. The combination with an axle, of a driving means rotatably mounted thereon, an internal gear forming a part of said driving means, a floating driving gear around said axle meshing with and rotated by said internal gear, a wheel, and gear means forming a part thereof adapted to transmit a changed drive from said floating driving gear to said wheel.

3. The combination with a sprocket wheel, of an internal gear rigidly secured thereon, a vehicle wheel, and gear mechanisms between said internal gear and said vehicle wheel for transmitting a reduced drive from said sprocket wheel to said vehicle wheel.

4. The combination with a driving member, of a vehicle wheel, an internal gear forming a part thereof, a balanced means projecting into and driven by said member, and gear means between said internal gear and said balanced means for transmitting a reduced drive from said driving member to said vehicle wheel.

5. The combination with an axle, of a driving member rotatably mounted thereon, a vehicle wheel rotatably mounted on said axle independently of said driving member, speed reducing gear means forming a part of said vehicle wheel, and a floating driving means around said axle held in position by said gear means for transmitting a changed drive from the driving member to said vehicle wheel.

6. The combination with a vehicle axle, of a chain driven sprocket-wheel and a driven wheel rotatably mounted on said axle, an internal gear forming a part of each of said wheels, a driving gear disposed around said axle and meshing with the internal gear on said sprocket wheel, and gear means also meshing with said driving gear and with the internal gear on said driving wheel to transmit a reduced drive from the sprocket wheel to said driven wheel.

7. The combination with a stationary internal gear, of an axle, a driving and a driven means rotatably mounted on said axle, an intermediate floating means engaging said driving means, and gear means engaged by said intermediate floating driving means and by said driven means for receiving and reducing a drive from the driving means to drive the driven means at a reduced rate of speed.

8. In a speed reducing mechanism the combination with a stationary internal gear, of an axle, a driving member and a vehicle driving wheel rotatably mounted on said axle, a floating driving gear disposed around said axle and engaging said driving member, a spider forming a part of said driving wheel, and gear members therein engaged with the floating driving gear and with the stationary internal gear and connected with the driving wheel to transmit a reduced drive from the driving members to the vehicle driving wheel.

9. The combination with a stationary internal gear and a driving internal gear, of floating gear means meshing with said driving internal gear, a wheel, and means thereon adapted to mesh with said stationary internal gear and with said floating gear means to transmit a drive from said driving internal gear to said wheel at a changed rate of speed.

10. The combination with a driving internal gear member, a stationary internal gear mechanism, a rotatable member, and means disposed between said internal gears and meshing therewith to receive a drive from said driving internal gear member and transmit the same to said rotatable member to rotate the same at a changed rate of speed.

11. The combination with an axle, of a driven driving member and a driven wheel journalled on said axle, of speed reduction mechanisms in said driven wheel, and a floating means around said axle held in position between said member and said mechanisms for transmitting a drive received by said member to said mechanisms to be changed thereby to rotate said wheel at a changed rate of speed.

12. In a speed reduction device of the class described, an axle, floating, rotating and stationary gear members associated with said axle, and a speed reduction wheel removably engaged with said floating and stationary gear members to receive a drive from said rotating gear members and reduce said drive.

13. A speed reduction device comprising a stationary axle, driving means rotatable thereon, a floating gear disposed around said axle and engaged with said driving means, and a mechanism driven by said floating gear for reducing the drive from said driving means.

In testimony whereof we have hereunto subscribed our names in the presence of two subscribing witnesses.

ALBERT E. COOK.
THOMAS VAN TUYL.

Witnesses:
FRANK A. BREMER, Jr.,
FRED E. PAESLER.